(12) United States Patent
Roopnarine

(10) Patent No.: US 7,506,876 B1
(45) Date of Patent: Mar. 24, 2009

(54) QUICK-CHANGE, TOOL-LESS COLLET/CHUCK SYSTEM

(75) Inventor: Roopnarine, New York, NY (US)

(73) Assignee: Honeybee Robotics, Ltd., New York, NY (US)

( * ) Notice: Subject to any disclaimer, the term of this patent is extended or adjusted under 35 U.S.C. 154(b) by 317 days.

(21) Appl. No.: 11/339,166

(22) Filed: Jan. 24, 2006

Related U.S. Application Data

(60) Provisional application No. 60/645,849, filed on Jan. 24, 2005.

(51) Int. Cl.
*B23B 31/165* (2006.01)

(52) U.S. Cl. ........................................ 279/42

(58) Field of Classification Search ............ 279/42, 279/48, 49, 52, 56, 69, 82; *B23B 31/165*
See application file for complete search history.

(56) References Cited

U.S. PATENT DOCUMENTS

| | | | | |
|---|---|---|---|---|
| 1,835,194 A | * | 12/1931 | Whiton | 279/119 |
| 4,260,169 A | * | 4/1981 | Hall | 279/62 |
| 6,913,429 B1 | * | 7/2005 | Phillips et al. | 409/182 |
| 6,932,357 B2 | * | 8/2005 | Jacobs et al. | 279/42 |
| 7,008,151 B2 | * | 3/2006 | Yaksich et al. | 408/240 |
| 7,021,400 B2 | * | 4/2006 | Oretti | 173/29 |
| 2003/0143042 A1 | * | 7/2003 | Doyle et al. | 408/124 |
| 2004/0222600 A1 | * | 11/2004 | Jacobs et al. | 279/48 |
| 2006/0061048 A1 | * | 3/2006 | Puzio et al. | 279/60 |
| 2007/0052183 A1 | * | 3/2007 | Draudt et al. | 279/63 |

* cited by examiner

*Primary Examiner*—David P Bryant
*Assistant Examiner*—Eric A Gates
(74) *Attorney, Agent, or Firm*—Leighton K. Chong

(57) ABSTRACT

A quick-change system for changing a collet or bit on a tool has a base member to be attached to the body of the tool, an input member to be selectively latched to or unlatched from the tool body, an output member coupled to the input member via a torque multiplication device and having splines that are engageable and disengageable with a collet nut for the tool having a splined member when the two parts are moved relative to each other a given axial distance. When the input member is latched to the tool's body, the output member and the collet nut are disengaged so as to allow the collet nut to rotate with the tool's spindle during operation of the tool. When the input member is unlatched from the tool's body, it can rotate freely and is spring biased to cause the collet nut and output member to move into engagement such that torquing the input member loosens or tightens the collet nut to release or clamp the bit, respectively. The torque multiplication device can be a planetary gear system or other torque transmission system.

15 Claims, 6 Drawing Sheets

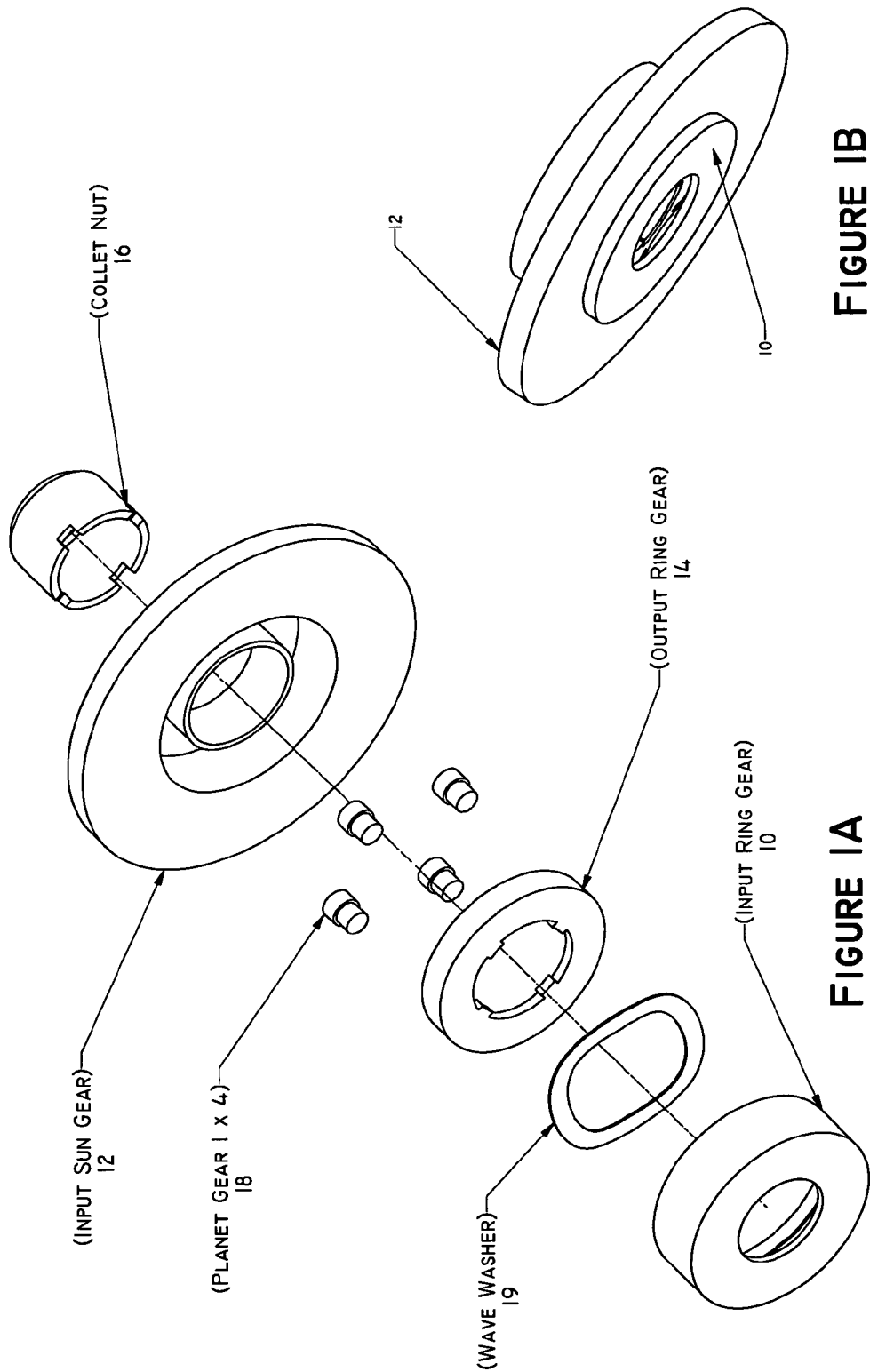

(UNLATCHED CONFIGURATION)

(LATCHED CONFIGURATION)

Latched Configuration

Unlatched Configuration

QUICK-CHANGE, TOOL-LESS COLLET/CHUCK SYSTEM

This U.S. patent application claims the benefit of the priority filing date of U.S. Provisional Application No. 60/645,849, filed on Jan. 24, 2005.

TECHNICAL FIELD

This invention generally relates to an improvement for rapidly changing cutting bits or collets on chucks without using a wrench or other tools.

BACKGROUND OF INVENTION

Currently, changing the bit on a router, for example, requires the operator to separate the motor unit from the base unit in order to provide access to the collet nut. The collet nut, when tightened, clamps on the collet and therefore on the shank of the bit positioned inside the collet. Once the base unit is separated from the motor unit to allow bit or collet change-out, the two parts must be re-assembled before work can continue. This re-assembly often requires the operator to maintain certain alignments in order to insure the proper functioning of the tool. When the base unit is attached to the motor unit, access to the collet nut is limited through windows in the base unit. To access the collet nut, a wrench could be inserted through one of these windows but its angle of swing is limited by the circumferential length of the window. Also, the special wrench could be easily misplaced resulting in a loss of productivity.

As outlined above, the process of changing a cutting bit or collet could be time-consuming and frustrating especially when access is limited and furthermore, in order to maintain proper functionality of the tool, the operator must precisely follow all steps in the process. The present invention completely eliminates the need to separate the motor unit from the base unit and provides a quick, easy and intuitive means of replacing bits and collets. Furthermore, no wrenches are required for the change-outs and the result is faster operation and more productivity.

SUMMARY OF INVENTION

In accordance with the present invention, a quick-change system for changing a collet or bit on a tool having a tool body and a spindle for a tool drive shaft has a base member to be attached to the body of the tool, an input member to be selectively latched to or unlatched from the tool body, and an output member coupled to the input member via a torque multiplication device and having splines that are engageable and disengageable with a collet nut for the tool having a splined member when the two parts are moved relative to each other a given axial distance. When the input member is latched to the tool's body, the output member and the collet nut are disengaged so as to allow the collet nut to rotate with the tool's spindle during operation of the tool. When the input member is unlatched from the tool's body, it can rotate freely and is spring biased to cause the collet nut and output member to move into engagement such that torquing the input member loosens or tightens the collet nut to release or clamp the bit, respectively.

In a preferred embodiment, the torque multiplication device is a planetary gear system. The base member is an input ring gear to be attached to the body of the tool, the input member is a sun gear proximate the input ring gear which is to be selectively latched to or unlatched from the tool body, the output member is an output ring gear proximate the sun gear and the input ring gear and having splines that are engageable and disengageable with a collet nut for the tool when the two are moved relative to each other a given axial distance. A set of planetary gears are arranged in an annular space defined between the respective facing parts of the sun gear and the input ring gear, with each planetary gear having a first gear portion at one end thereof meshing between the sun gear and the second and a second gear portion at an opposite end thereof for meshing with the output ring gear. The two gear portions preferably have differing pitch diameters, with one gear portion meshing with the input ring and sun gears, and the other gear portion meshing with the output ring gear. The planet gears maintain these meshes (with the sun, input and output ring gears) at all times and are free to rotate about their own axes and revolve around the sun gear.

The output ring gear is spring loaded and maintained in the stowed (operating) condition by contact with an inner annular extension of the sun gear. In the latched configuration, a spring (wave washer) is compressed between the input ring gear and the output ring gear, such that the mating splines on the output ring gear and the collet nut are fully disengaged. This allows the collet nut (with collet and bit) to rotate freely with the tool's spindle during operation. To change the tool's bit, the operator locks the tool spindle from rotating (using existing locking mechanisms that are built into the tool) and simply unlatches the input sun gear from the tool body, so as to allow the input sun gear to rotate freely. Because of the compressed spring acting on the output ring gear, rotation of the sun gear will cause the collet nut and output ring gear to mate once their splines are in the correct orientation. Once the splines are mated, as described above, torquing the sun gear will loosen or tighten the collet nut and release or clamp the bit, respectively. To return the tool to its operational setting, the operator re-latches the input sun gear to the tool's body.

In another embodiment, the output ring gear axially fixed (but free to rotate) and engageable with a splined washer which is free to axially translate when the input sun gear is unlatched. This splined washer is spring loaded such that when the input sun gear is unlatched it translates axially to engage a second set of splines with the collet nut. The splined washer always remains in rotational engagement with the output ring gear and acts to torsionally couple the output ring gear to the collet nut. When the sun gear is re-latched or stowed, the splined washer is removed from engagement with the collet nut.

The configuration of the quick-change system is such that it does not rotate with the tool's spindle and is fixed to the router's or tool's body. Because of this, there is no need to make sure that the quick-change system is rotationally balanced as there are no dynamic considerations. This also means that the run-out capability of the tool is not, in any way, affected by the quick-changer. No tools or wrenches are required to change the output shaft, which means faster operations and makes it easy and simple to change bits or collets for different shank diameters.

Other objects, features, and advantages of the present invention will be explained in the following detailed description of the invention having reference to the appended drawings.

BRIEF DESCRIPTION OF DRAWINGS

FIG. 1A is an exploded view of the quick-change system of the present invention, and FIG. 1B shows an assembled view.

DETAILED DESCRIPTION OF INVENTION

Figure 2A:
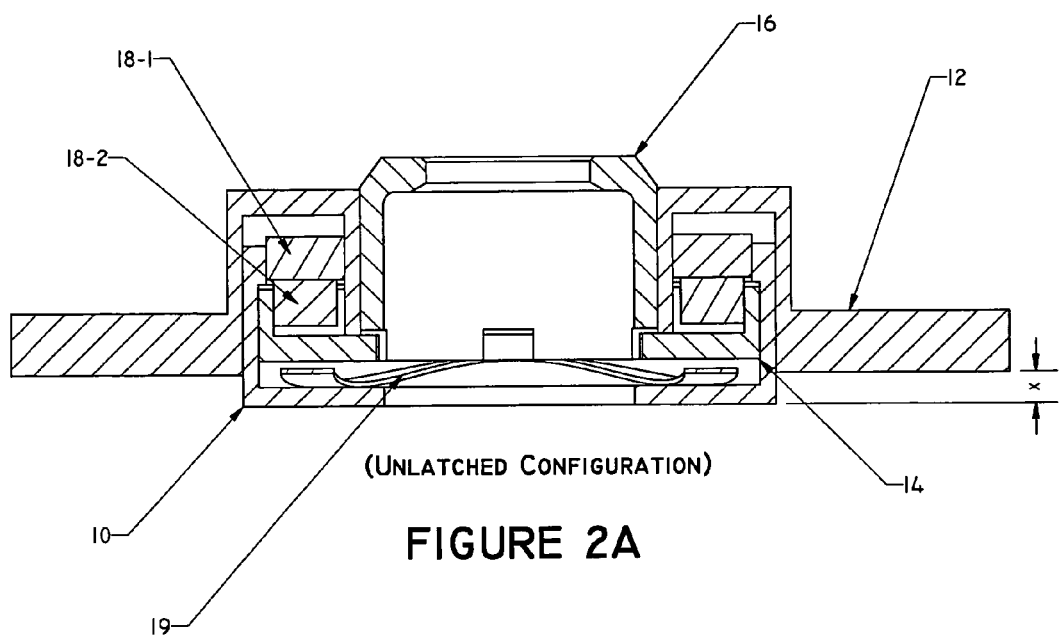
FIG. 2A shows a cross-sectional view of the system in an unlatched configuration.

In the following detailed description, certain preferred embodiments are described with specific details set forth in order to provide a thorough understanding of the present invention. However, it will be recognized by one skilled in the art that the principles of the present invention may be practiced with substitutes for the parts described or with other equivalents thereof.

Referring to FIGS. 1A and 1B, a quick-change system for changing collets/bits on the chuck of various wood and metalworking tools (for example, routers) employs a differential planetary transmission having an input ring gear 10 to be attached to the body of the tool, a sun gear 12 that can be selectively latched or unlatched from the tool's body, and an output ring gear 14 that is splined to engage with a collet nut 16 for holding a collet or bit. The output ring gear 14 is spring loaded by a wave washer 19 and maintained in the stowed (operating) condition by contact with an inner annular extension of the sun gear, or it may be loaded against the collet nut when the sun gear is released and unlatched from the tool's body. A set of planetary gears 18 is provided (4 gears shown in the drawing) for meshing between the input and output gears.

Figure 2B:
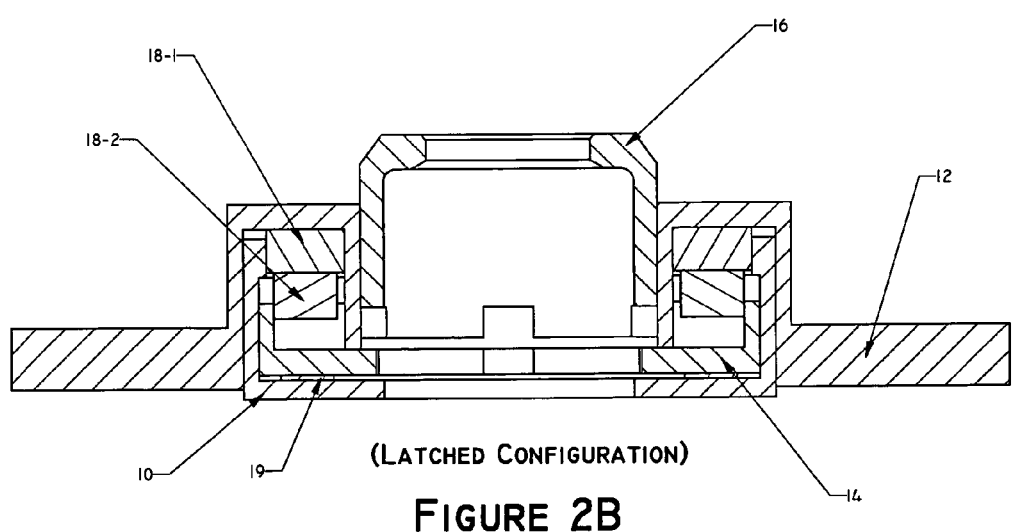
FIG. 2B shows a cross-sectional view in a latched configuration.

Referring to FIGS. 2A and 2B, the system is shown in side sectional views in unlatched and latched configurations. The planetary gears 18 each have two gear portions of differing pitch diameters (labeled planet gear portion 18-1 and planet gear portion 18-2). The gear portions may be formed from the same piece of stock. Alternatively, if they are formed as two separate gear portions, they must be rotationally keyed and axially held together to act as one piece. Planet gear portion 18-1 meshes with the input ring gear 10 and sun gear 12, and planet gear portion 18-2 meshes with the output ring gear 14. The planet gears 18 maintain these meshes (with the sun, input and output ring gears) at all times and are free to rotate about their own axes and revolve around the sun gear. An idler sun gear may be placed in mesh with the planet gear portions 18-2 to react radial forces, or the planet gears may be attached to a carrier (or cage) for the same purpose. If an idler sun gear is used, it must be free to translate axially as the input sun gear will stow the output ring gear through it. For mounting a bit to the tool, the cutting bit is placed in a collet which is clamped and retained by the collet nut 16 attached to the tool's spindle (drive shaft). In the latched configuration, the wave washer 19 is compressed between the input ring gear 10 and the output ring gear 14.

Figure 3:
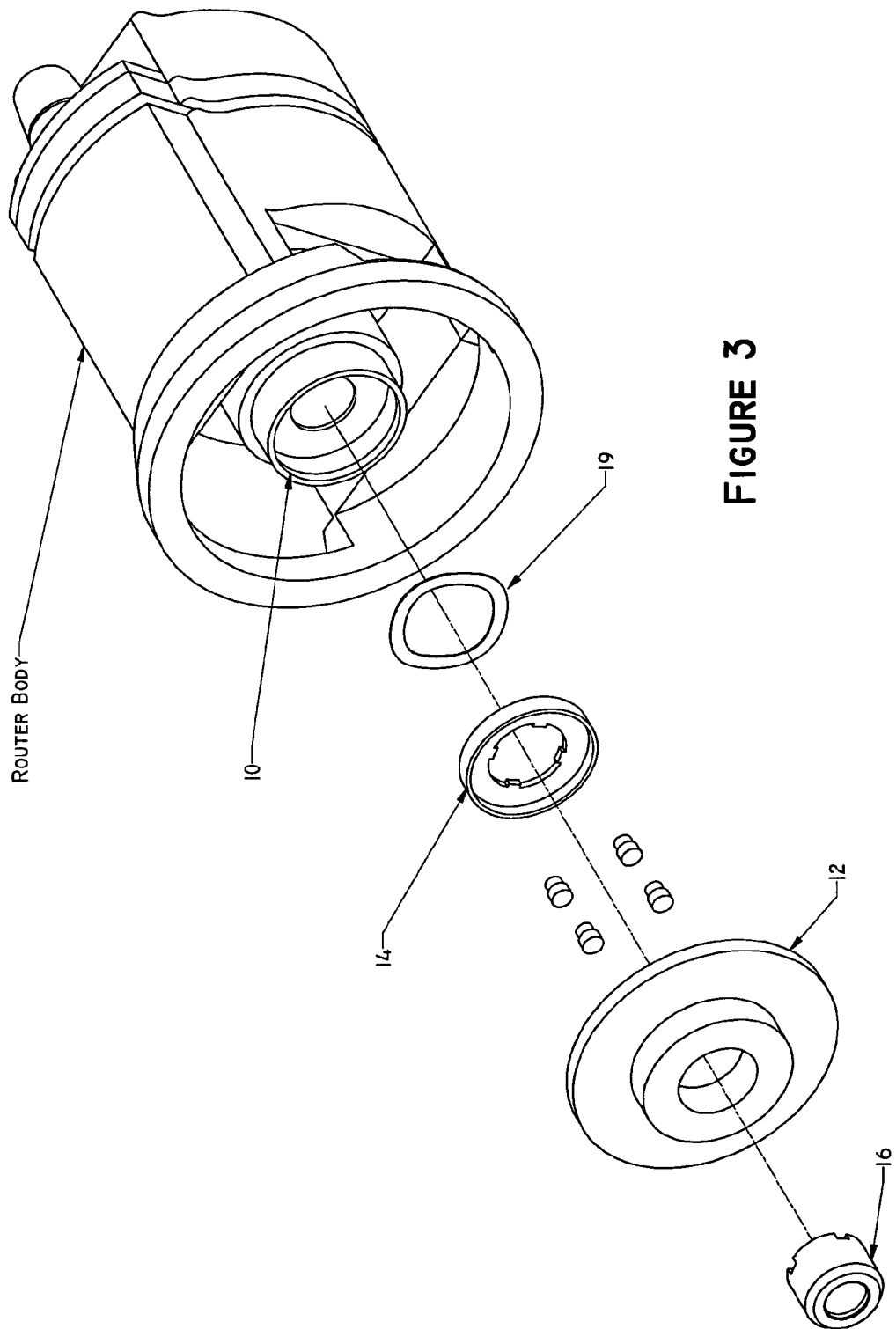
FIG. 3 shows an exploded view of the quick-change system for mounting to a router.

FIG. 3 shows an exploded view of the quick-change system for mounting to a router body. The input ring gear 10 is mounted concentrically around the tool's spindle (drive shaft). A cutting bit is placed in a collet which is clamped and retained by the collet nut 16 attached to the tool's spindle. The collet nut only engages with the output ring gear when the bit is to be changed, not during the operation of the tool. A mechanism can be provided to ensure, via an electrical switch, that the tool will not operate unless the output ring gear is disengaged from the collet nut.

Figure 4:
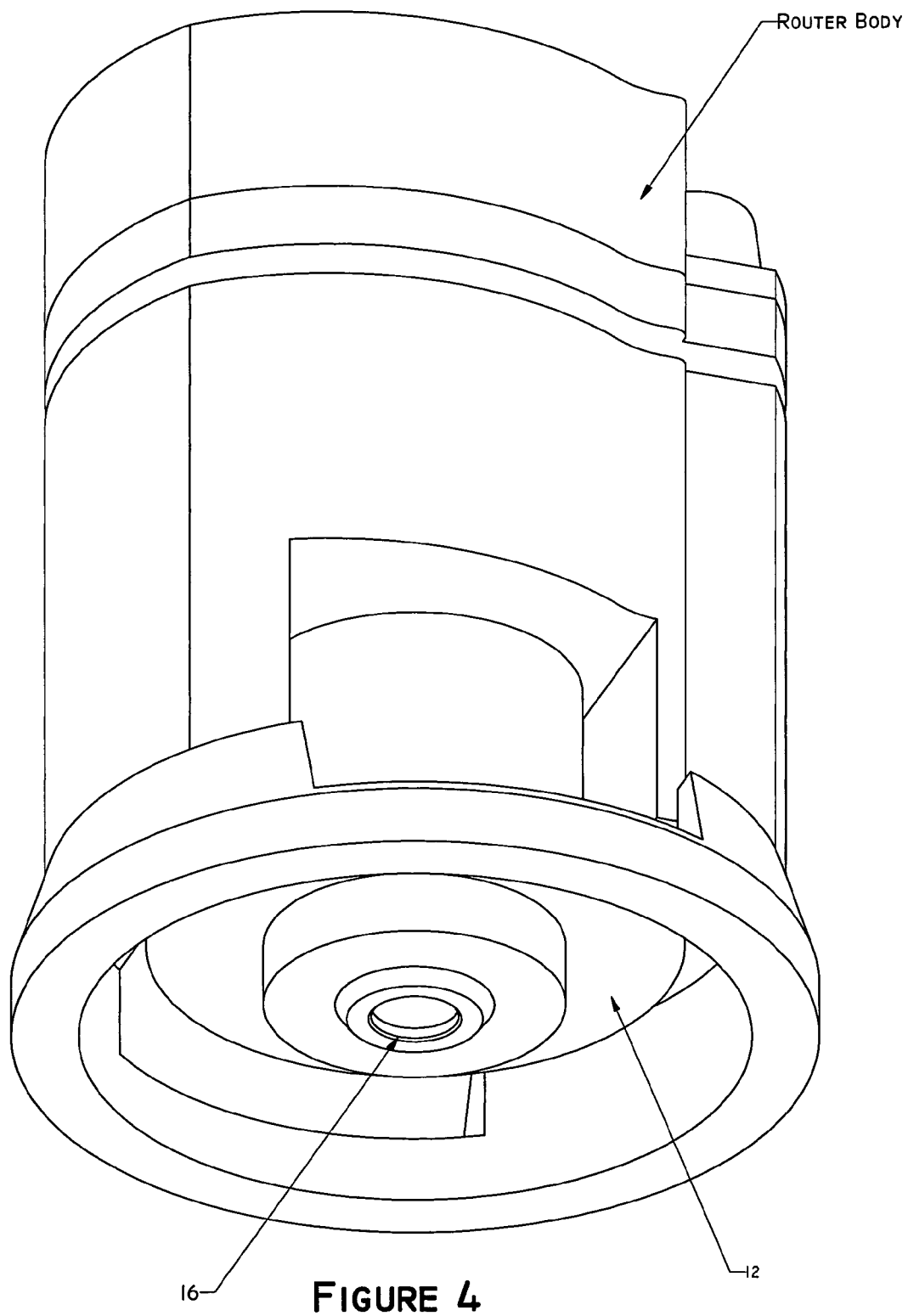
FIG. 4 shows a view of the quick-change system as mounted to a router.

FIG. 4 shows a view of the quick-change system assembled to the router body with the collet nut 16 facing outwardly from the facing side thereof.

The quick-change system works as follows. During normal operation of the tool (e.g., a router), the input sun gear 12 is fixed to the body of the tool via an operator releasable latch (or latches). For safety, the tool is electrically wired such that it will not operate if this gear is not in the fully latched position. In this position, the sun gear 12 also compresses a spring (wave washer or other type of spring) such that the mating splines on the output ring gear 14 and the collet nut 16 are fully disengaged. This allows the collet nut 16 (with collet and bit) to rotate freely with the tool's spindle during operation. To change the tool's bit, the operator locks the tool spindle from rotating (using existing locking mechanisms that are built into the tool) and simply unlatches the input sun gear 12 from the tool's body, so as to allow the input sun gear 12 to rotate freely. Because of the compressed spring(s) acting on the output ring gear 14, rotation of the sun gear 12 will cause the collet nut 16 and output ring gear 14 to mate once their splines are in the correct orientation (the output ring gear will move a given axial distance for this engagement to occur. The operator drives the sun gear at its maximum diameter through the access holes in the sides of the height adjustment sleeve (or base unit) on the router, for example, the maximum outer diameter (OD) on the sun gear will be determined by the inner diameter (ID) of the height adjustment sleeve at the location of the quick-change. Because of this larger diameter, the operator will be able to impart sufficient torques to the sun gear in order to tighten the collet nut 16. Alternatively, a pinion gear or ratcheting lever can be used to drive the sun gear near its OD. Once the splines are mated, as described above, torquing the sun gear will loosen or tighten the collet nut and release or clamp the bit, respectively. To return the tool to its operational setting, the operator must re-latch the input sun gear to the tool body.

Because of the compressed spring acting on the output ring gear, rotation of the sun gear 12 will cause the collet nut 16 and output ring gear 14 to mate once their splines are in the correct orientation. The output ring gear 14 will move a given axial distance "x", as shown in FIG. 2A, for this engagement to occur. Once the splines are mated, torquing the sun gear will loosen or tighten the collet nut and release or clamp the bit, respectively.

The latch used to secure the input sun gear to the router's or tool's body can be as simple as detent pins or draw (or tension) latches. The latch could also be a clamp style latch which is typically used to fix the motor unit to the base unit on a router and spindle lock mechanisms are an integral part of the design of rotary tools such as routers. The latch can be designed to simply allow pulling on the sun gear axially in order to unlatch it.

The planetary transmission as described in the primary embodiment above may be replaced instead with any other type of torque transmission device that can provide torque multiplication, for example, a traction drive, or a sun gear and pinion assembly, etc.

With this configuration, the planetary or other torque transmission system does not rotate with the tool's spindle and is fixed to the router's or tool's body. Because of this, there is no need to make sure that the quick-change system is rotationally balanced as there are no dynamic considerations. This also means that the run-out capability of the tool is not, in any way, affected by the quick-changer. No tools or wrenches are required to change the output shaft, which means faster operations and makes it easy and simple to change bits or collets for different shank diameters.

Use of a planetary or other torque transmission system for torque multiplication allows low operator input torques to tighten the collet nut and clamp the bit. For example, an operator's input torque of 25 in-lb could generate at least 250 in-lb of torque (assuming a 10:1 reduction) on the clamping nut which will provide a sufficiently large clamping load on the bit shank and is equal to conventional holding forces. The quick-changer system maintains full compatibility with standard collets and bit shank diameters. The bit will not loosen during operation. The system is easy to use with intuitive operations, and can tolerate workplace contaminants. A safety power switch is also incorporated to prevent inadvertent operation of the tool when the input sun gear is in the unlatched position.

Figure 5A:
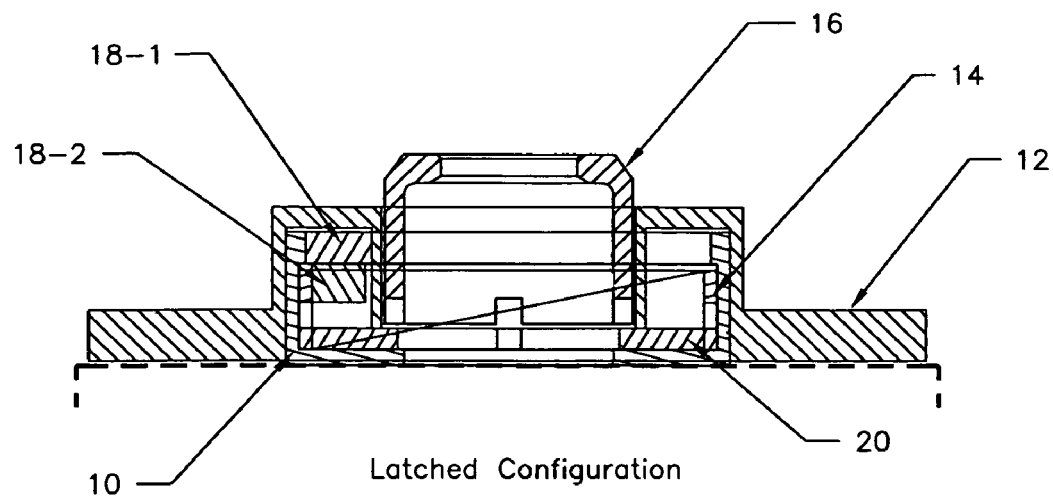
FIG. 5A shows a cross-sectional view of an alternative embodiment of the invention in a latched configuration with the tool part (in phantom line)
Figure 5B:
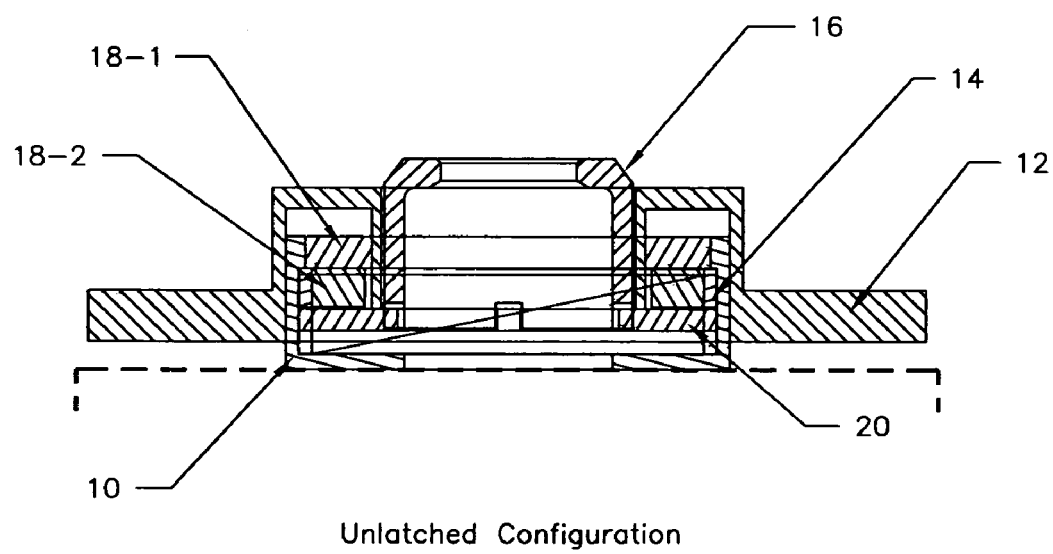
FIG. 5B shows it in an unlatched configuration.
Figure 5C:
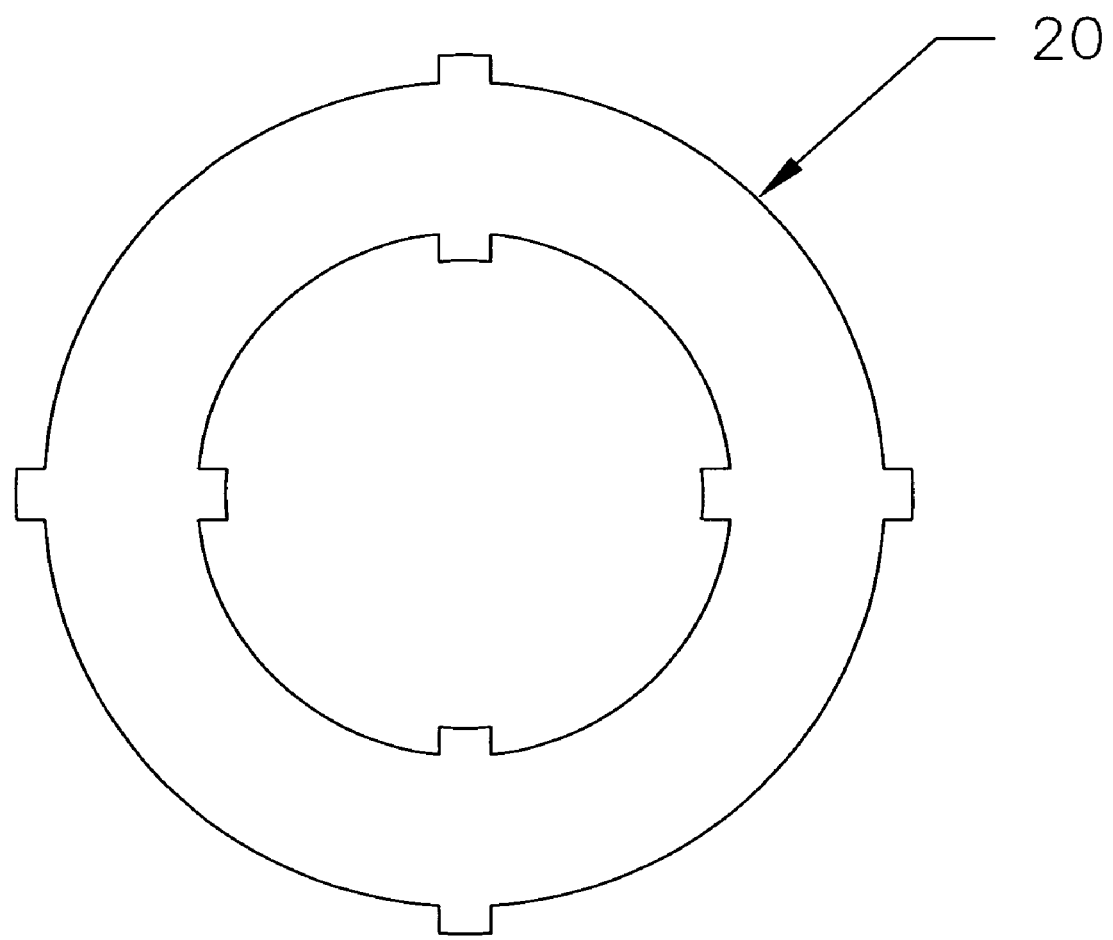
FIG. 5C is a detailed view of the splined washer shown in FIGS. 5A and 5B.

The invention can also be implemented via another embodiment as shown in FIGS. 5A and 5B that has the output ring gear 14 axially fixed (but free to rotate) and engageable with a splined washer 20 which is free to axially translate when the input sun gear is unlatched. This splined washer is spring loaded (not shown in FIGS. 5A and 5B) such that when the input sun gear is unlatched it translates axially to engage a second set of splines with the collet nut. The splined washer always remains in rotational engagement with the output ring gear and acts to torsionally couple the output ring gear to the collet nut. When the sun gear is re-latched or stowed, the splined washer is removed from engagement with the collet nut. FIG. 5C shows a detailed view of the splined washer 20 in FIGS. 5A and 5B.

It is understood that many modifications and variations may be devised given the above description of the principles of the invention. It is intended that all such modifications and variations be included within the invention, as defined in the following claims.

The invention claimed is:

1. A quick-change system for changing a collet or bit on a tool having a tool body and a spindle for a tool drive shaft, comprising:
   an input ring gear to be attached to the body of the tool,
   a sun gear proximate the input ring gear which is to be selectively latched to or unlatched from the tool body, wherein an annular space is defined between respective facing parts of the sun gear and the input ring gear,
   an output ring gear proximate the sun gear and the input ring gear and having splines that are engageable and disengageable with a collet nut holding a collet or bit for the tool when the two are moved relative to each other a given axial distance,
   a set of planetary gears arranged in the annular space defined between the respective facing parts of the sun gear and the input ring gear, each planetary gear having a first gear portion at one end thereof meshing between the sun gear and the input ring gear and a second gear portion at an opposite end thereof for meshing with the output ring gear, and
   a collet nut for holding a collet or bit,
   wherein when the sun gear is latched to the tool body, the output ring gear and the collet nut are disengaged so as to allow the collet nut to rotate with the tool's spindle during operation of the tool, and
   wherein when the sun gear is unlatched from the tool body for changing the tool's collet or bit, the unlatched sun gear can rotate freely and is spring biased to cause the collet nut and output ring gear to move relative to each other the given axial distance to bring the output ring gear into engagement with the splines of the collet nut such that torquing the sun gear loosens or tightens the collet nut to release or clamp the bit, respectively.

2. A quick-change system for changing a collet or bit on a tool according to claim 1, wherein the two gear portions of the set of planetary gears is provided with differing pitch diameters, and wherein one of the two gear portions meshes with the input ring and sun gears, and the other gear portion meshes with the output ring gear.

3. A quick-change system for changing a collet or bit on a tool according to claim 1, wherein a spring is provided between the input ring gear and the output ring gear for spring loading the output ring gear into splined engagement with the collet nut when the sun gear is unlatched from the tool's body.

4. A quick-change system for changing a collet or bit on a tool according to claim 3, wherein the spring is a wave washer interposed between the input ring gear and the output ring gear.

5. A quick-change system for changing a collet or bit on a tool according to claim 1, wherein the combination of input ring gear, sun gear, planetary gears, and output ring gear is replaced by an equivalent torque multiplication device.

6. A quick-change system for changing a collet or bit on a tool according to claim 1, wherein the splined output ring gear is axially fixed and engages with a splined washer which is spring loaded such that when the sun gear is unlatched the washer translates axially to engage the splined collet nut while remaining in engagement with the output ring gear.

7. A quick-change system for changing a collet or bit on a tool having a tool body and a spindle for a tool drive shaft, comprising:
   a base member to be attached to the body of the tool,
   an input member coupled to the base member which is to be selectively latched to or unlatched from the tool body,
   an output member coupled to the input member via a torque multiplication device and having splines that are engageable and disengageable with a collet nut holding a collet or bit for the tool having a splined member when the two parts are moved relative to each other a given axial distance, and
   a collet nut having the splined member which is to be used for holding a collet or bit,
   wherein when the input member is latched to the tool body, the output member and the collet nut are disengaged so as to allow the collet nut to rotate with the tool's spindle during operation of the tool, and
   wherein when the input member is unlatched from the tool body for changing the tool's collet or bit, the unlatched input member can rotate freely and is spring biased to cause the collet nut and output member to couple rotationally and torsionally via the splines engaging the splined member such that torquing the input member loosens or tightens the collet nut to release or clamp the bit, respectively.

8. A quick-change system for changing a collet or bit on a tool according to claim 7 wherein:
   the base member is an input ring gear to be attached to the body of the tool,
   the input member is a sun gear proximate the input ring gear which is to be selectively latched to or unlatched from the tool body, wherein an annular space is defined between respective facing parts of the sun gear and the input ring gear,
   the output member is an output ring gear proximate the sun gear and the input ring gear and having splines that are directly engageable and disengageable with the collet nut for the tool when the two are moved relative to each other a given axial distance, and the torque multiplication device includes a set of planetary gears arranged in the annular space defined between the respective facing parts of the sun gear and the input ring gear, each planetary gear having a first gear portion at one end thereof meshing between the sun gear and the input ring gear and a second gear portion at an opposite end thereof for meshing with the output ring gear and thereby providing a link for torque multiplication.

9. A quick-change system for changing a collet or bit on a tool according to claim 8, wherein the two gear portions of the set of planetary gears is provided with differing pitch diameters, and wherein one of the two gear portions meshes with the input ring and sun gears, and the other gear portion meshes with the output ring gear.

10. A quick-change system for changing a collet or bit on a tool according to claim 8, wherein a spring is provided between the input ring gear and the output ring gear for spring loading the output ring gear into splined engagement with the collet nut when the sun gear is unlatched from the tool's body.

11. A quick-change system for changing a collet or bit on a tool according to claim 10, wherein the spring is a wave washer interposed between the input ring gear and the output ring gear.

12. A quick-change system for changing a collet or bit on a tool according to claim 7 wherein:

the base member is an input ring gear to be attached to the body of the tool, the input member is a sun gear proximate the input ring gear which is to be selectively latched to or unlatched from the tool body, wherein an annular space is defined between respective facing parts of the sun gear and the input ring gear, the output member is an output ring gear proximate the sun gear and the input ring gear and having splines that are indirectly engageable and disengageable via a splined washer provided with the collet nut for the tool when the two are moved relative to each other a given axial distance, and the torque multiplication device includes a set of planetary gears arranged in the annular space defined between the respective facing parts of the sun gear and the input ring gear, each planetary gear having a first gear portion at one end thereof meshing between the sun gear and the second and a second gear portion at an opposite end thereof for meshing with the output ring gear and thereby providing a link for torque multiplication.

13. A quick-change system for changing a collet or bit on a tool according to claim 12, wherein the two gear portions of the set of planetary gears is provided with differing pitch diameters, and wherein one of the two gear portions meshes with the input ring and sun gears, and the other gear portion meshes with the output ring gear.

14. A quick-change system for changing a collet or bit on a tool according to claim 12, wherein a spring is provided between the input ring gear and the splined washer for spring loading the splined washer into splined engagement with the collet nut when the sun gear is unlatched from the tool's body.

15. A quick-change system for changing a collet or bit on a tool according to claim 7, wherein the torque multiplication device is replaced by an equivalent torque multiplication device.

* * * * *